(12) United States Patent
Oprins et al.

(10) Patent No.: US 10,830,535 B2
(45) Date of Patent: Nov. 10, 2020

(54) APPARATUS FOR LOADING AND UNLOADING A FREEZE-DRYER

(71) Applicant: I.M.A. INDUSTRIA MACCHINE AUTOMATICHE S.P.A., Ozzano dell'Emilia (IT)

(72) Inventors: Geert Jan Oprins, Ozzano dell'Emilia (IT); Claudio Trebbi, Ozzano dell'Emilia (IT)

(73) Assignee: I.M.A. INDUSTRIA MACCHINE AUTOMATICHE S.P.A., Ozzano dell'Emilia (IT)

( * ) Notice: Subject to any disclaimer, the term of this patent is extended or adjusted under 35 U.S.C. 154(b) by 194 days.

(21) Appl. No.: 16/085,780

(22) PCT Filed: Mar. 17, 2017

(86) PCT No.: PCT/IB2017/051558
§ 371 (c)(1),
(2) Date: Sep. 17, 2018

(87) PCT Pub. No.: WO2017/158563
PCT Pub. Date: Sep. 21, 2017

(65) Prior Publication Data
US 2019/0049181 A1 Feb. 14, 2019

(30) Foreign Application Priority Data
Mar. 18, 2016 (IT) .................. 102016000028811

(51) Int. Cl.
*F26B 25/00* (2006.01)
*F16G 13/20* (2006.01)
*F26B 5/06* (2006.01)

(52) U.S. Cl.
CPC ............ *F26B 25/001* (2013.01); *F16G 13/20* (2013.01); *F26B 5/06* (2013.01)

(58) Field of Classification Search
CPC .......... F16G 13/20; F26B 25/001; F26B 5/06; B65G 47/82
(Continued)

(56) References Cited

U.S. PATENT DOCUMENTS 3,243,049 A * 3/1966 Seligmann, Jr. ........ F25D 25/00
                                                    211/74
3,706,408 A * 12/1972 Burch .................. B27M 3/0073
                                                    227/45
(Continued)

FOREIGN PATENT DOCUMENTS

CN        103896058        7/2014
EP        1 619 459        1/2006
(Continued)

OTHER PUBLICATIONS

International Search Report dated Jun. 29, 2017 in International (PCT) Application No. PCT/IB2017/051558.
(Continued)

*Primary Examiner* — Edelmira Bosques
*Assistant Examiner* — Bao D Nguyen
(74) *Attorney, Agent, or Firm* — Wenderoth, Lind & Ponack, L.L.P.

(57) ABSTRACT

A movement apparatus for loading/unloading containers (100) into/from a freeze-dryer (50) provided with a freeze drying chamber (51) that has at least one shelf (52) for receiving and supporting containers (100), comprising a push bar (2) to push the containers (100) and a movement arrangement (3) for moving the push bar (2) through the freeze drying chamber (51) along a direction of movement (A); the movement arrangement (3) comprises at least one rigid interlocking chain linear actuator (4) that has a first movement rigid interlocking chain (43) mobile along the
(Continued)

direction of movement (A) and provided with a first operating end (14) connected to the push bar (2).

10 Claims, 9 Drawing Sheets

(58) Field of Classification Search
USPC .............................................................. 34/92
See application file for complete search history.

(56) References Cited

U.S. PATENT DOCUMENTS

| | | | | |
|---|---|---|---|---|
| 5,129,162 | A * | 7/1992 | Hemmersbach | B65G 65/00 34/217 |
| 5,924,838 | A * | 7/1999 | Garvey | B65G 47/088 198/434 |
| 5,964,043 | A * | 10/1999 | Oughton | F26B 5/06 34/284 |
| 2006/0016094 | A1 * | 1/2006 | Covert | F26B 5/06 34/217 |
| 2006/0263179 | A1 * | 11/2006 | Selch | F26B 25/001 414/222.01 |
| 2008/0131240 | A1 * | 6/2008 | Damen | F26B 25/003 414/226.01 |
| 2008/0134537 | A1 * | 6/2008 | Damen | F26B 25/001 34/92 |
| 2009/0019724 | A1 * | 1/2009 | Wagner | F26B 25/001 34/573 |
| 2009/0025251 | A1 * | 1/2009 | Wagner | F26B 5/06 34/573 |
| 2009/0241362 | A1 * | 10/2009 | Balboni | F26B 25/001 34/92 |
| 2010/0070108 | A1 * | 3/2010 | Kluetsch | F26B 25/001 701/2 |
| 2010/0154242 | A1 * | 6/2010 | Battenberg | F26B 5/06 34/92 |
| 2011/0168737 | A1 * | 7/2011 | Veltrop | F16G 13/20 222/41 |
| 2011/0232123 | A1 * | 9/2011 | DeMarco | F26B 5/06 34/284 |
| 2012/0159803 | A1 * | 6/2012 | Van Veen | F26B 5/06 34/284 |
| 2012/0186947 | A1 * | 7/2012 | Christ | F26B 25/001 198/747 |
| 2013/0185952 | A1 * | 7/2013 | Christ | F26B 25/003 34/92 |
| 2013/0205927 | A1 * | 8/2013 | Saji | F16G 13/20 74/30 |
| 2013/0283945 | A1 * | 10/2013 | Kaisaku | B66F 13/005 74/89.21 |
| 2014/0215845 | A1 * | 8/2014 | Corver | F26B 5/06 34/284 |
| 2014/0230265 | A1 * | 8/2014 | Christ | F26B 5/06 34/284 |
| 2015/0047951 | A1 * | 2/2015 | Trebbi | F26B 25/003 198/738 |
| 2016/0116212 | A1 * | 4/2016 | Trebbi | F26B 5/06 414/222.01 |
| 2017/0225912 | A1 * | 8/2017 | Beppu | B65G 65/00 |

FOREIGN PATENT DOCUMENTS

| | | |
|---|---|---|
| EP | 2 700 844 | 2/2014 |
| JP | 08-169693 | 7/1996 |
| JP | 2000-320963 | 11/2000 |
| JP | 2012-031973 | 2/2012 |

OTHER PUBLICATIONS

Japanese Office Action dated Oct. 1, 2019 in corresponding Japanese Patent Application No. 2018-549239 with English translation.

* cited by examiner

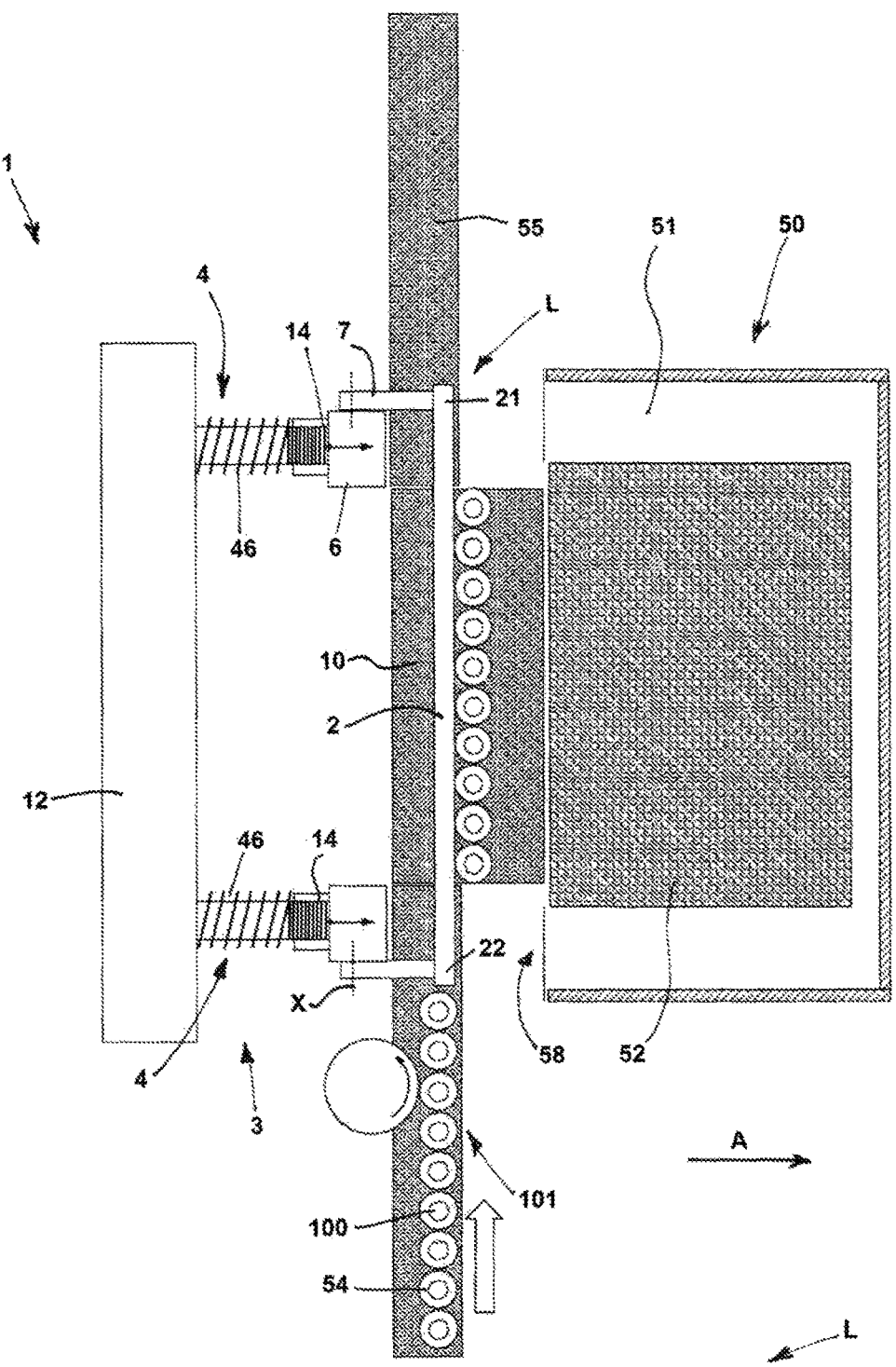
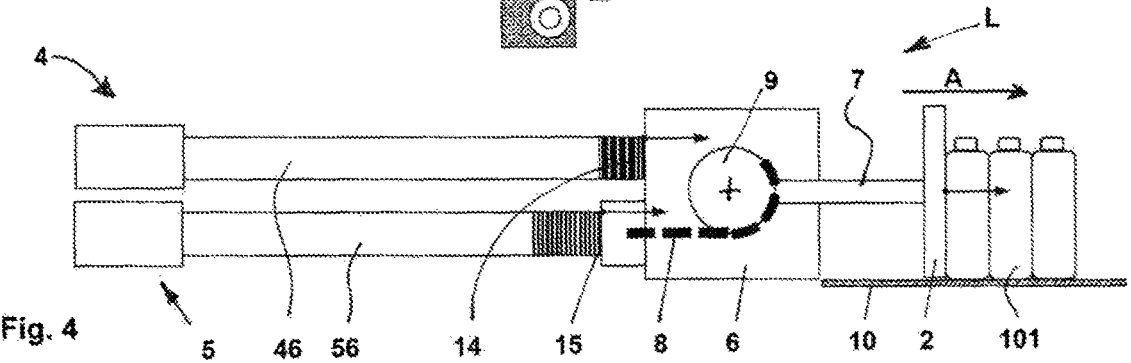
Fig. 3
Fig. 4

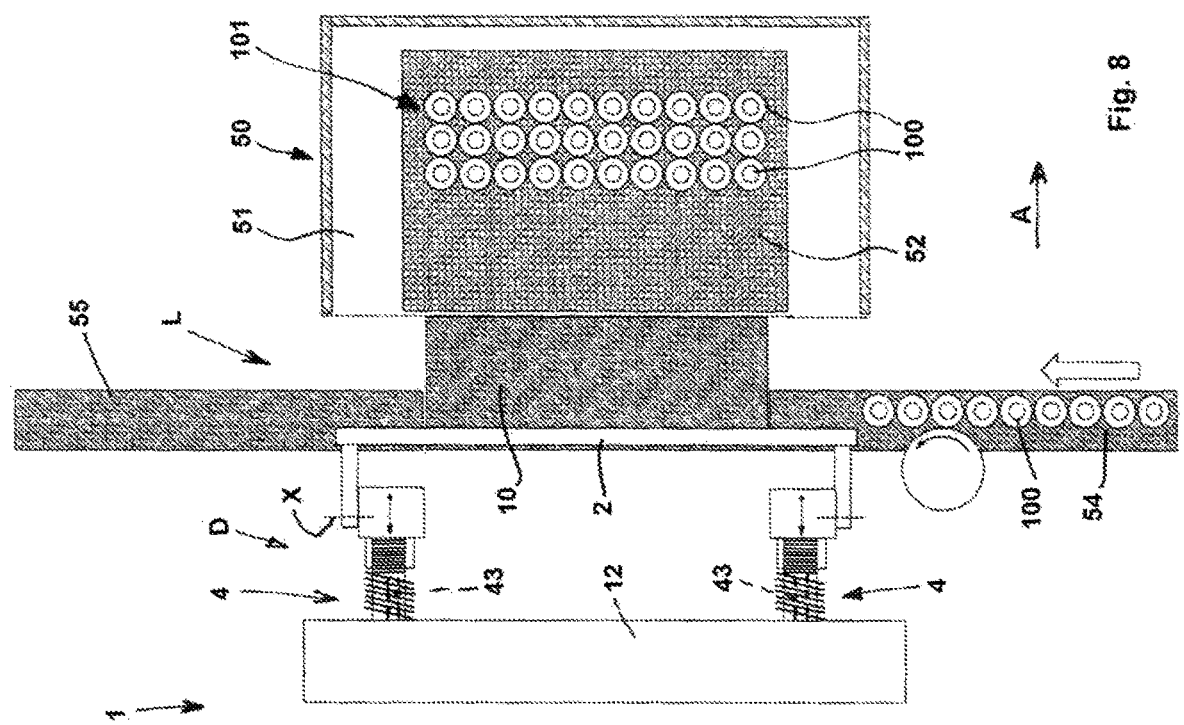
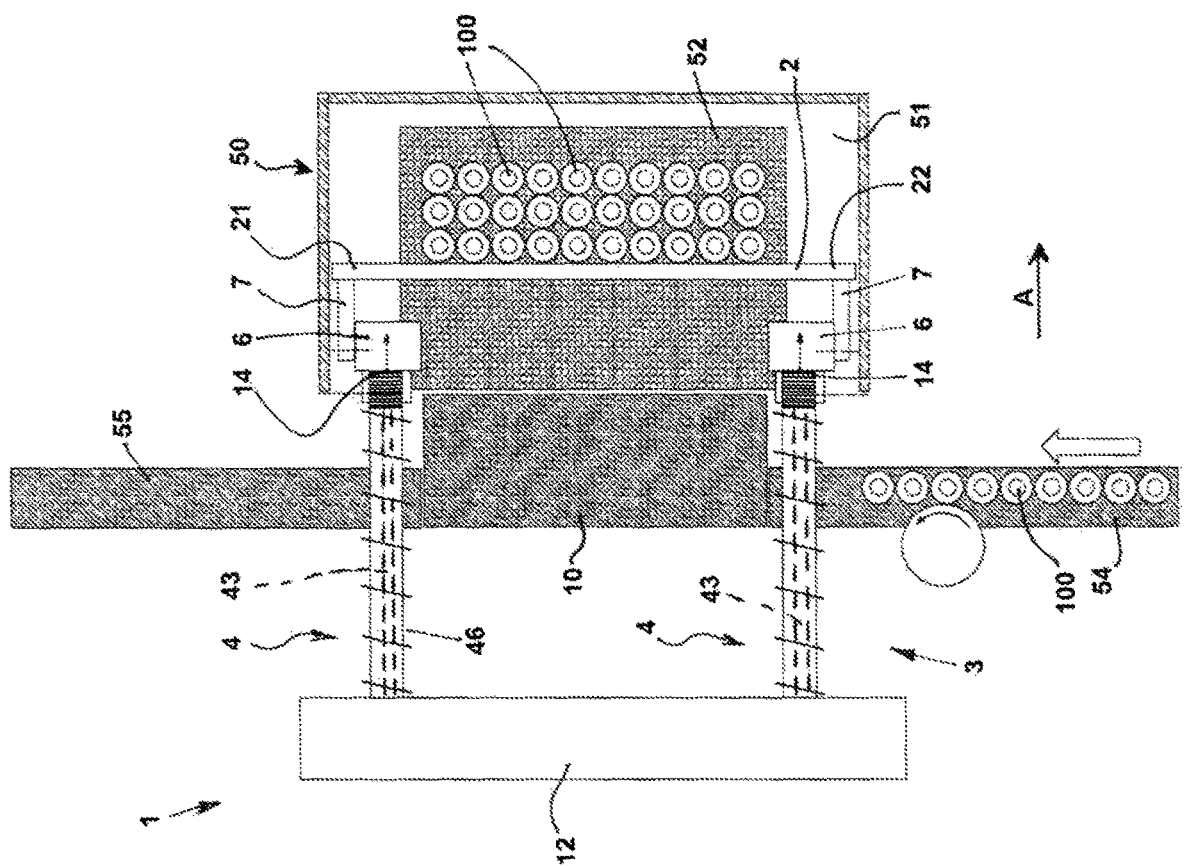

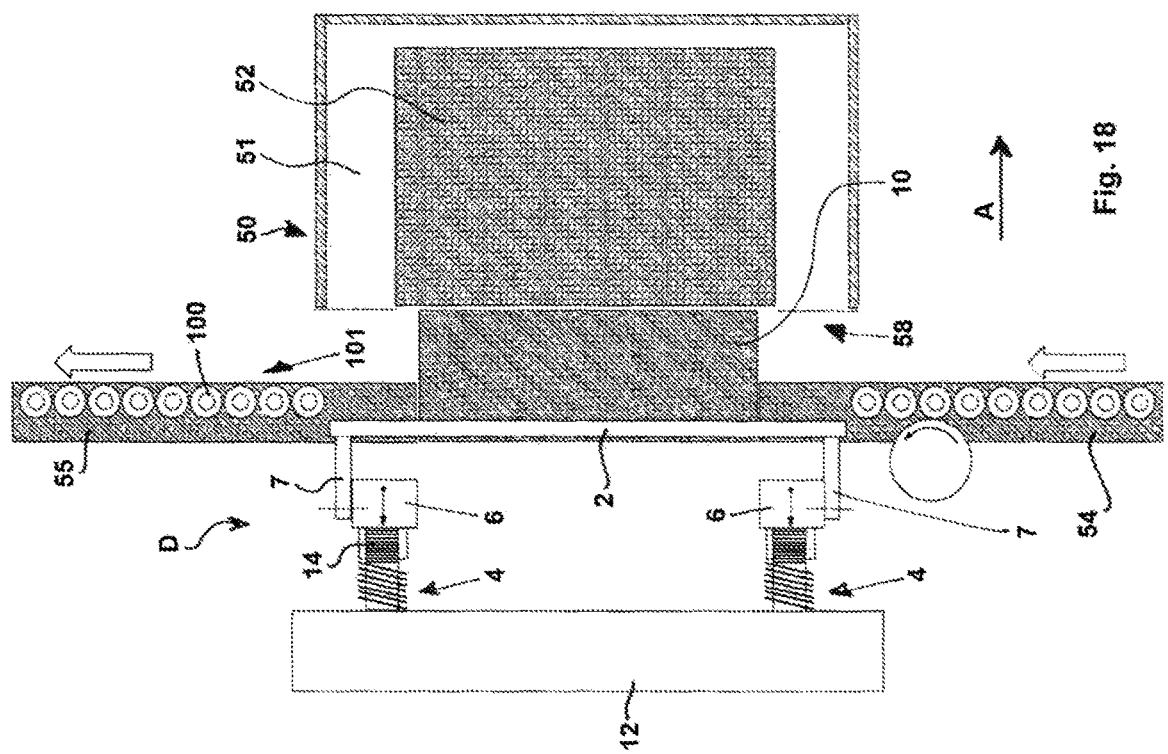
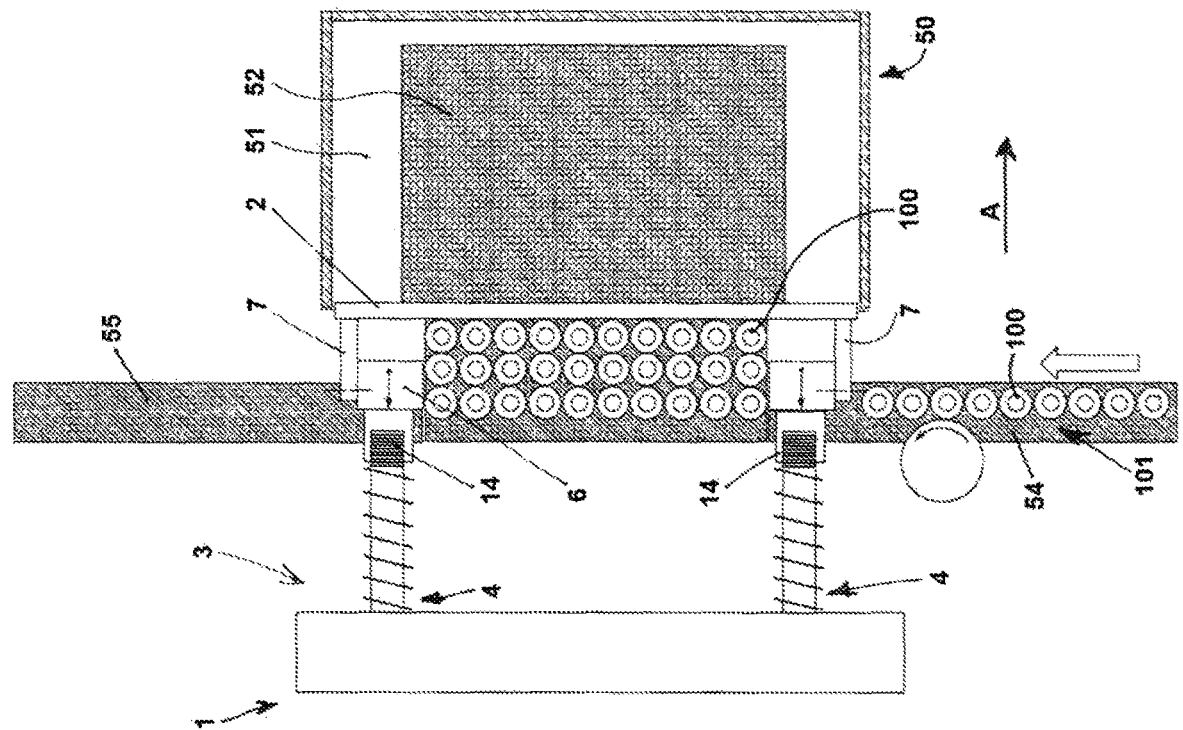

APPARATUS FOR LOADING AND UNLOADING A FREEZE-DRYER

The present invention concerns to movement systems and apparatuses for loading/unloading freeze-dryers and it refers in particular to a movement apparatus that can be mounted on an industrial freeze-dryer for loading/unloading into/from the latter containers containing a product to be freeze-dried. The invention also concerns to a freeze-dryer comprising such an apparatus for moving the containers.

The known freeze-dryers typically comprise a freeze drying chamber adapted to receive a plurality of containers, as bottles, phials, ampoules or containers alike, wherein there is a substance or product to be freeze-dried, e.g. a pharmaceutical or food product. The chamber is connected to a refrigeration unit and to an air aspiration unit (vacuum pump) in order to be refrigerated and depressed with respect to the external atmospheric pressure. The freeze drying process, also called cold air drying, employs in fact low temperatures and high depression values (vacuum) to sublimate the water contained in the product and dry the latter.

The freeze drying chamber of the industrial freeze-dryers comprises a plurality of shelves arranged one on top of the other and vertically spaced, whereon the containers can be disposed in rows placed side by side. Specific movement means allows to move the shelves vertically inside the freeze drying chamber so as to dispose each shelf to be loaded with, or unloaded from, the containers in front of an access opening of the chamber.

A loading apparatus is provided in front of the opening for pushing the containers from a supplying conveyor, whereon they are arranged side by side, onto one of the shelves of the freeze drying chamber. The loading apparatus can move one row of containers at a time inside the chamber repeating the operation row by row until the shelf is full or it can move a plurality of rows, for example the whole quantity of containers to be placed on the shelf.

An unloading apparatus disposed at the opposite side of the freeze drying chamber is provided for pushing the containers, row by row or all together, outside the chamber once the freeze drying process is finished, moving the containers from the shelf to the conveyor through the same access opening.

Each loading or unloading apparatus comprises a transversal push bar, having substantially the same length as a width of the shelf so as to engage the whole row of containers and driving mechanisms to move the transversal push bar through the freeze drying chamber for the whole depth of the shelf.

As known, the industrial freeze-dryers for pharmaceutical use are generally inserted, at least partially, in controlled sterile atmosphere chambers, due to the sterility requirements requested for the freeze-dried products. For the same sterility reasons, also the apparatuses for loading/unloading the containers must be placed inside the sterile freeze-dryers chambers or in any case inserted in specific insulators that are adjacent and connected to the sterile chambers.

The dimensions of the loading/unloading apparatuses contribute considerably to increase the general size of the freeze-dryer and may create serious constraints and limitations as regards the positioning or insertion of the freeze-dryer thereof inside a production plant.

It must also be considered that, since the costs of the sterile chambers, both for constructing them and for maintaining the sterile environment within them, increase with the overall size of the freeze-dryer, the apparatuses for loading/unloading the containers may affect considerably the freeze-dryer costs and its maintenance.

The known loading/unloading apparatuses typically comprise pneumatic or hydraulic or electric barrels able to move the transversal push bars of the containers. However, as the length of the pistons or beams of such barrels must substantially be the same as the depth or length of the freeze drying chamber in order to permit to move the containers for the whole depth of the shelf of the freeze-dryer, the aforesaid loading/unloading devices are particularly bulky and thus not much adapted to be used in a sterile environment, within sterile chambers.

An object of the present invention is improving the known movement apparatuses connectable to freeze-dryers for loading/unloading into/from the latter containers containing a product to be freeze-dried.

Another object is supplying a movement apparatus permitting to move in a precise and efficient way the containers inside and outside the freeze-dryer and having particularly compact sizes so as to reduce the total size of the freeze-dryer thereof.

A further object is implementing a movement apparatus having simple and cheap structure and construction and, at the same time, strong and reliable.

Another further object is supplying a movement apparatus particularly adapted to be used in a sterile environment, able to reduce and substantially eliminate the risks of contamination or loss of sterility of the containers and/or of the product during the functioning.

In a first aspect of the invention, a movement apparatus is provided for loading/unloading containers into/from a freeze-dryer according to claim 1.

In a second aspect of the invention a freeze-dryer is provided comprising the movement apparatus of the first aspect and according to claim 9.

The invention shall be better understood and implemented referring to the enclosed drawings showing a non-limiting exemplary embodiment, wherein:

FIGS. 3 and 4 are respectively plan and side schematic views of the apparatus of FIG. 1 in a following loading phase of the first row of containers;

FIGS. 5 to 8 are plan schematic views of the apparatus of FIG. 1 in following loading phases of rows of containers in a freeze drying chamber of the freeze-dryer;

Figure 1:
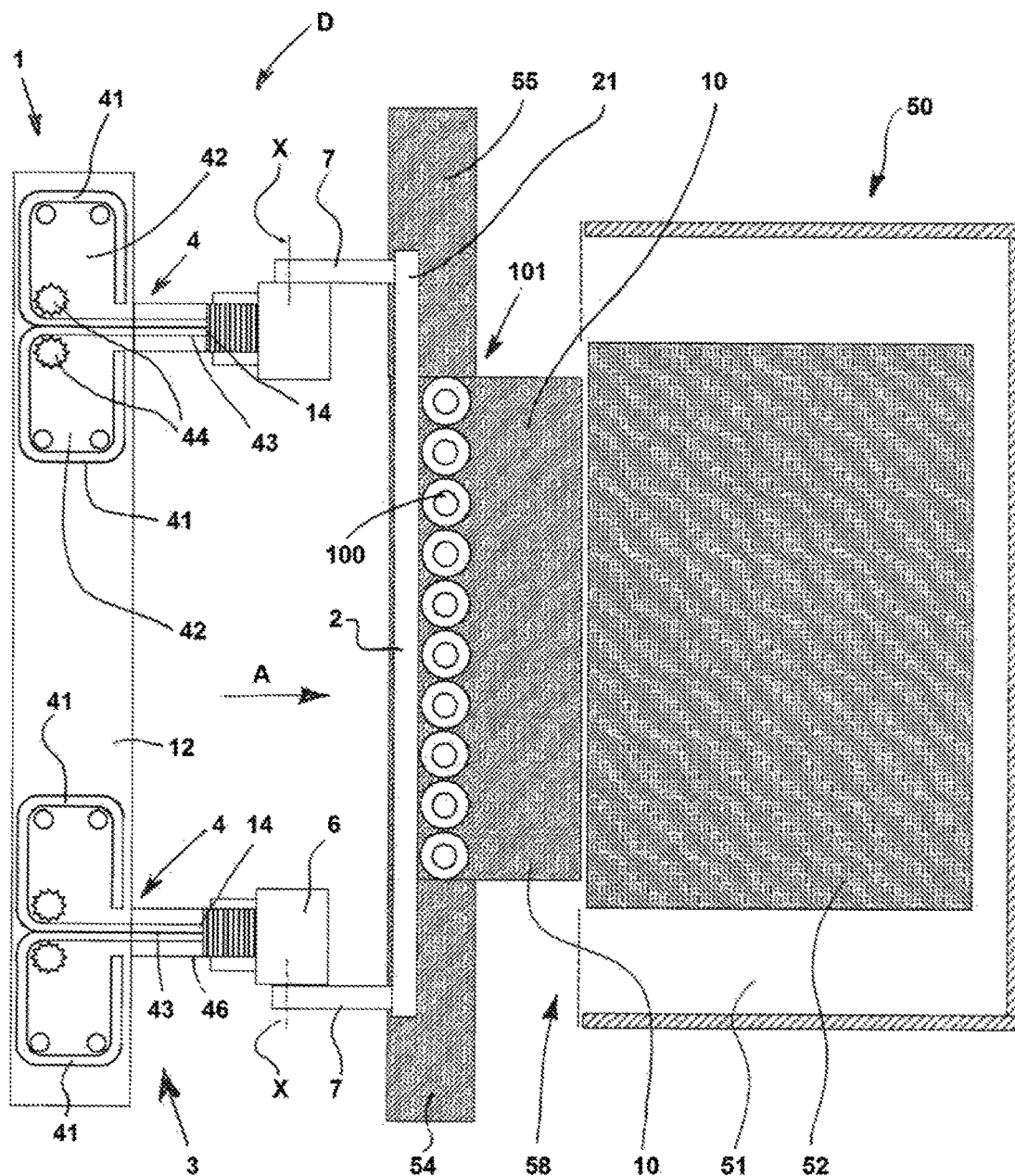
FIG. 1 is a plan schematic view of a movement apparatus according to the invention for loading/unloading containers into/from a freeze-dryer, partially illustrated, in a loading phase of a first row of containers.

Figures from 9 to 16 are plan and side schematic views of the apparatus of FIG. 1 in following unloading phases of the containers of the freeze drying chamber;

FIGS. 17 and 18 are plan views of the apparatus of FIG. 1 in following exiting phases of the containers from the freeze-dryer through means of movement means.

Referring to Figures from 1 to 18, it is schematically illustrated a movement apparatus 1 arranged for loading/unloading containers 100 into/from a freeze-dryer 50 or similar, of the known type and not shown in detail, equipped with a freeze drying chamber 51 having one or more shelves 52 adapted to receive and support the containers 100, or trays not shown whereon the containers are laid, the latter containing a substance or a product to be freeze-dried or freeze-dried, typically a pharmaceutical or food product. The freeze-dryer 50 also comprises a collecting plane 10 of the containers 100 placed in front of an access opening 58 of the freeze drying chamber 51 and arranged for supporting the containers 100 that the movement apparatus 1 inserts into the freeze drying chamber 51 or extracts from the latter once the freeze drying process is completed.

Movement means 54, 55 of the known type is provided for moving the containers 100 entering or exiting from the collecting plane 10.

In the embodiment shown, the movement means comprises a first entrance conveyor 54 that moves the containers 100 towards the collecting plane 10 and a second exit conveyor that moves the containers 100 exiting and distancing from the collecting plane 10.

In one variation not shown, the movement means may comprise a single conveyor beside which the collecting plane 10 is arranged at the access opening 58 of the freeze-dryer.

The movement apparatus 1 comprises a push bar 2 arranged to engage and push the containers 100 (or the trays whereon the containers 100 are laid) and movement arrangement 3 for moving the aforesaid push bar 2 through the freeze drying chamber 51 along a direction of movement A so as to insert or extract the containers 100.

The following description will refer to the case wherein the containers 100 are directly laid on shelves 52 and the push bar 2 directly engages such containers 100, however it is intended that the invention also applies to the case wherein the containers are laid on a relative tray. In other words, the movement apparatus 1 according to the invention can indiscriminately directly engage and push the containers 100, or the trays supporting the containers 100.

The push bar 2 comprises, for example, a flat elongated bar provided with opposite first and second walls 2a, 2b flat and arranged to find the containers 100 (or the trays whereon the containers 100 are laid). The push bar 2 has a length that is substantially the same as the width of the shelf 52 of the freeze-dryer 50.

The movement arrangement 3 comprises at least a rigid interlocking chain linear actuator, having a movement rigid interlocking chain mobile along the direction of movement A and provided with an operating end fixed to the push bar 2.

Such an actuator is for example disclosed in the patent EP 2700844 and produced and traded by Tsubakimoto Chain Co. With the trade name Zip Chain Actuator®.

In particular, the movement arrangement 3 comprises at least a first rigid interlocking chain linear actuator 4, having a first movement rigid interlocking chain 43 mobile along the direction of movement A and provided with a first operating end 14 connected to the push bar 2.

In the shown embodiment, the movement arrangement 3 comprises in particular a pair of first rigid interlocking chain linear actuators 4 fixed to opposite ends 21, 22 of the push bar 2.

Each first linear actuator 4 comprises a respective pair of chains 41, typically of the roller chain type, flexible, mutually joint and fixed at the operating end 14 and separately windable within the respective housings 42, at least in a retracted position of the first linear actuator 4. The flexible chains 41 can be winded on themselves several times in order to reduce the encumbrance of the housings 42.

The aforesaid flexible chains 41 can be mutually coupled and connected among them when moved towards each other so as to form the first movement rigid interlocking chain 43 of variable length (according to the unrolling of the chains 41 thereof), that is mobile along the direction of movement A and provided with the first operating end 14. In particular, each chain 41 is engaged and moved by a respective toothed wheel 44 so as to wind within the respective housing 42 or unroll and couple to the other chain 41 to form the first rigid interlocking chain 43. The toothed wheels 44 are made rotate together at the same speed by an electric motor of the known type and not shown in the Figures.

The first movement rigid interlocking chain 43 is rigid to flexion and able to support, besides traction forces, compression forces as well, in other words to support even significant peak loads with no need to be laterally supported by sliding guides. Thereby, as better explained in the hereinafter description, the first movement rigid interlocking chain 43 of the first linear actuator 4 is able to move and push the push bar and all the receivable containers 100 on the shelf 52 along the direction of movement A in both ways (loading and unloading).

Moreover, the movement arrangement 3 of the apparatus according to the present invention comprises at least a second rigid interlocking chain linear actuator 5 having a second movement rigid interlocking chain 53 and arranged to rotate the push bar 2 about a rotation axis X at least between a lowered position L, wherein said push bar 2 is arranged to engage and push the containers 100, and a raised position R, wherein the push bar 2 is not engaged with the containers 100 and does not interact with the latter ones. The rotation axis X is transverse, in particular substantially orthogonal, to the direction of movement A.

Advantageously, the second rigid interlocking chain linear actuator 5 is substantially similar to the first rigid interlocking chain linear actuator 4.

In the illustrated embodiment, the movement arrangement 3 also comprises, apart from a pair of rigid interlocking chain linear actuators 4, a pair of second rigid interlocking chain linear actuators 5 operating on the opposite ends 21, 22 of the push bar 2.

Each second linear actuator 5 is adjacent to the first linear actuator 4.

Advantageously, each second linear actuator 5 is arranged under a corresponding first linear actuator 4.

In alternative, the second linear actuator 5 can be arranged above namely placed on top of the corresponding first linear actuator 4.

The movement apparatus 1 comprises at least one movement element 6, for example a pair of movement elements 6 attached to the first operating ends 14 of the first linear actuators 4. Each movement element 6 rotatably supports about the rotation axis X a respective support arm 7 fixed to an end 21, 22 of the push bar 2.

Each second rigid interlocking chain linear actuator 5 comprises a respective second movement rigid interlocking chain 53 mobile along the direction of movement A and provided with a second operating end 15 connected through transmission assembly 8, 9 to the support arm 7, so as to rotate the latter, and thus the push bar 2 about the rotation axis X through the transmission assembly 8, 9.

Figure 2:
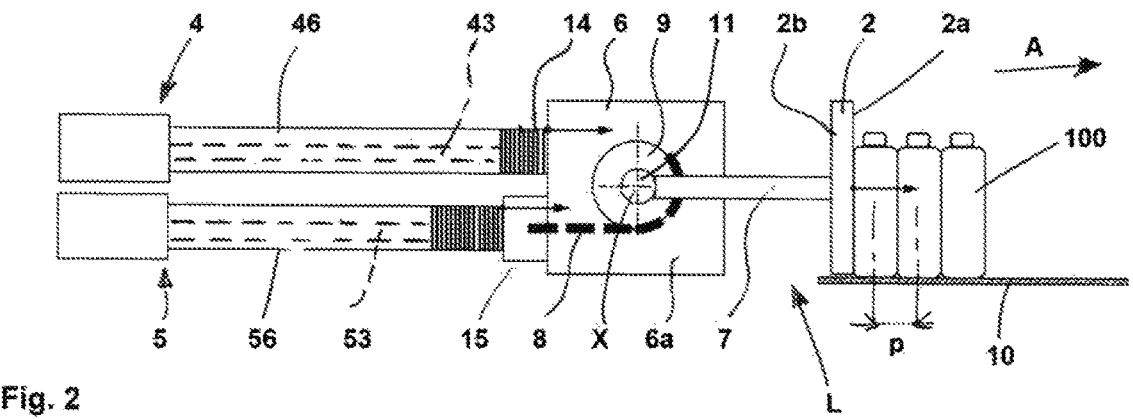
FIG. 2 is a side schematic view of the apparatus of FIG. 1.

The transmission assembly of each movement element 6 includes, for example, a wheel 9 rotatably fixed within the movement element 6 and connected to the second operating end 15 of the respective second linear actuator 5 through a flexible connecting element 8, in particular a chain element, flexible in a single direction. The flexible connecting element 8 is partially winded and fixed around the wheel 9, that supports the respective support arm 7 through a pin 11 exiting from a lateral wall 6a of the movement element 6 (FIG. 2).

As illustrated in details in the Figures from 9 to 16, a linear movement along the direction of movement A of the second movement rigid interlocking chain 53 of the second linear actuator 5 determines the winding or the unrolling of the flexible connecting element 8 around the respective wheel 9 and the rotation of the latter and thus of the support arm 7 and of the push bar 2 about the rotation axis X, from the lowered position L to the raised position R and vice versa.

The movement apparatus 1 comprises a containment enclosure 12 within which the first and the second rigid interlocking chain linear actuators 4, 5 are housed, and through which the respective first and second movement rigid interlocking chains 43, 53 protrude, connected to the movement elements 6 and to the support arms 7 of the ends 21, 22 of the transverse push bar 2.

In order to protect the sterility of the environment wherein the freeze-dryer 50 is disposed and in particular to avoid the contamination of the containers 100 and of the product contained therein, flexible containment elements 46, 56, e.g. folding elements, are provided for sealingly enclosing and containing the movement rigid interlocking chain 43, 53. More precisely a respective first folding element 46 contains the first rigid interlocking chain 43 of the corresponding first linear actuator 4, said first folding element 46 being sealingly fixed to a first end of the containment enclosure 12 and to a second end of the movement element 6.

Similarly, a respective second folding element 56 contains the second rigid interlocking chain 53 of the corresponding second linear actuator 5, said second folding element 56 being sealingly fixed to a first end of the containment enclosure 12 and to a second end of the movement element 6.

The functioning of the movement apparatus 1 of the invention connectable to a freeze-dryer 50 for loading or unloading containers 100 containing a product to be freeze-dried or freeze-dried provides for a loading procedure of the freeze-dryer 50 comprising a plurality of consecutive phases hereinafter described with reference to Figures from 1 to 8.

In a starting phase (FIGS. 1 and 2) a row 101 of containers 100 is disposed by movement means 54, 55 at the access opening 58 of the freeze drying chamber 51. In this starting phase, the transverse push bar 2 is in the lowered position L and is more spaced from the freeze drying chamber 51 in a retracted position D to allow the passage of the containers 100, the first linear actuators 4 and the second linear actuators 5 being arranged in their respective retracted positions.

In a following phase (FIGS. 3 and 4) the first linear actuators 4 are initiated so as to move the push bar 2 in the direction of movement A to push the row 101 of bottles 100 by a pace p (substantially equal to one diameter of the body of the containers 100) towards the freeze drying chamber 51. The second linear actuators 5 are initiated in a coordinated way with the first linear actuators 4 to maintain the push bar 2 in the lowered position L, wherein a first flat and elongated wall 2a of the push bar 2 finds the containers 100.

Figure 5:
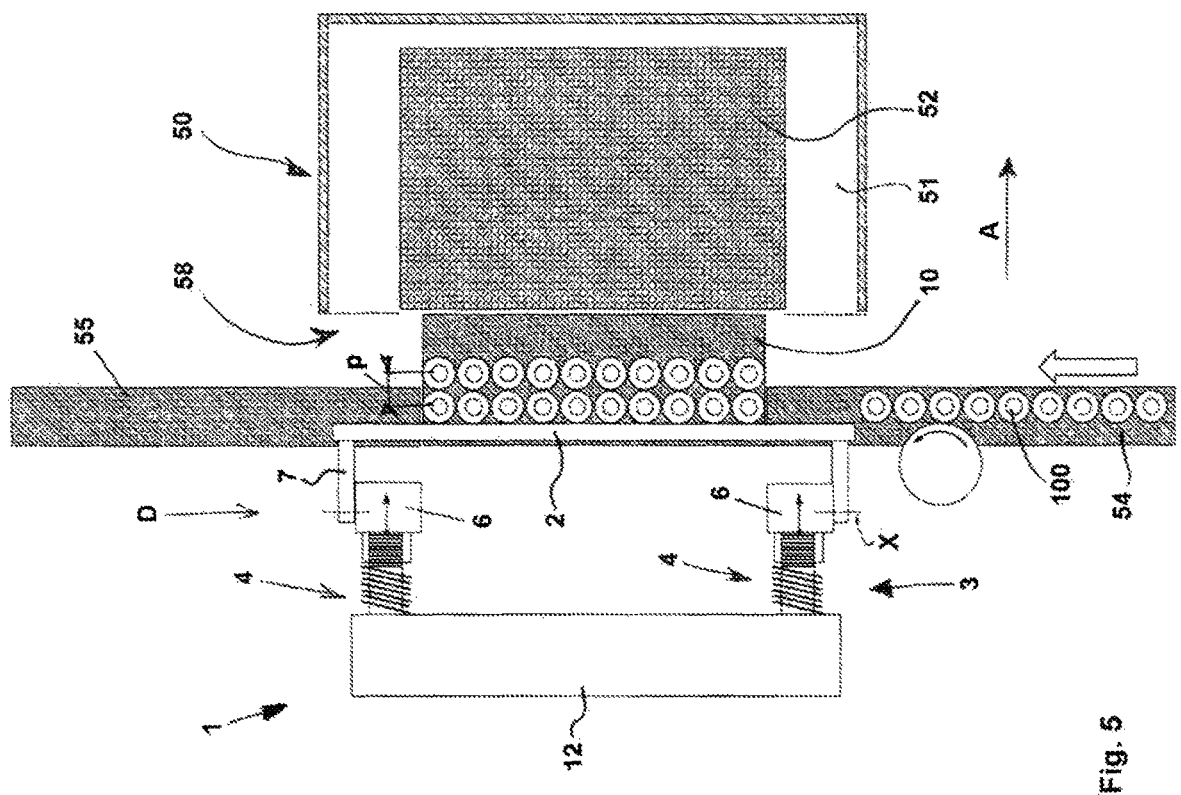

In a following phase (FIG. 5) the push bar 2 is returned back by the first linear actuators 4 to the retracted position D to allow the positioning on the collecting plane 10 of another row 101 of containers 100 that is placed side by side to the preceding row 101 of containers.

Figure 6:
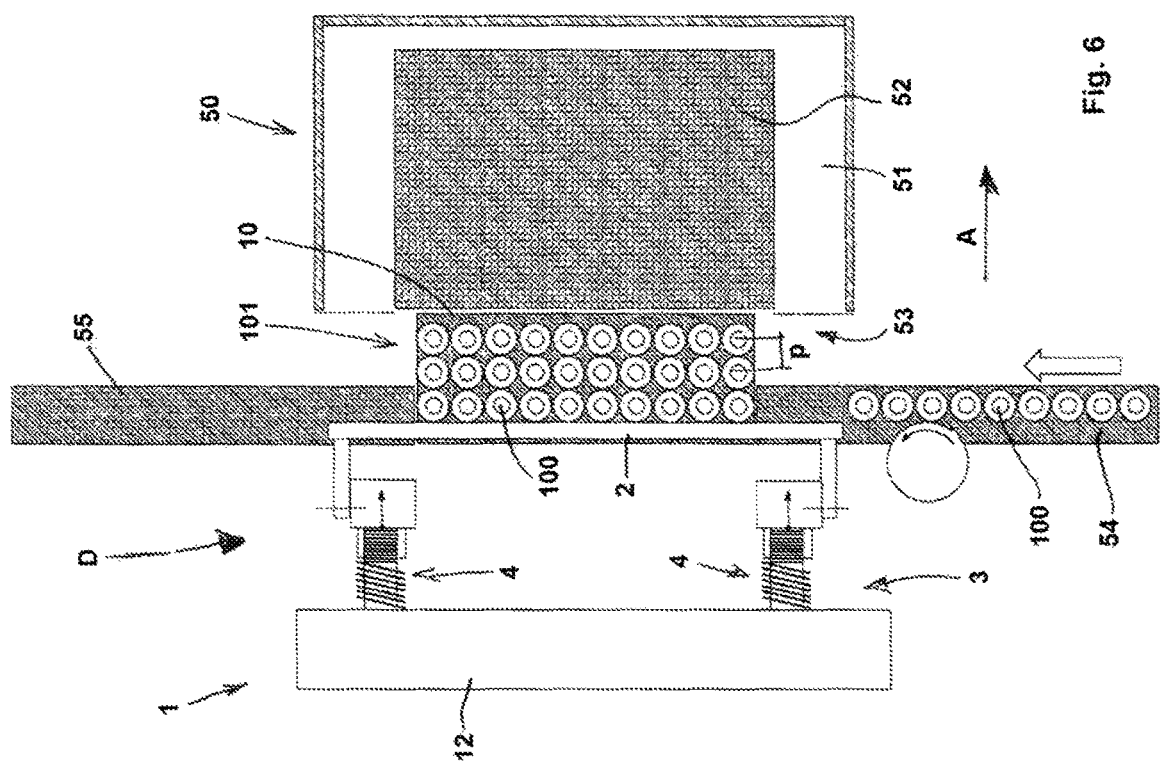

The push bar 2 is then moved so as to push both the rows 101 of containers 100 towards the access opening 58 of the freeze drying chamber 51, the course or movement of the push bar 2 being always equal to a pace p. The two above described phases repeat, the push bar 2 being taken back to the retracted position D and thus moved in the direction of movement A with a stroke equal to the pace p until it realizes a group of rows 101 of containers 100 that can be supported by a single shelf 52 of the freeze drying chamber 51 (see FIGS. 4-6).

Once the group of rows 101 is completed, the push bar 2 is moved with an extra stroke, that is a stroke having a pace bigger than pace p, to push the group of rows 101 of containers 100 completely inside the freeze drying chamber 51 (see FIG. 7).

It must be noted that the containers 100 of two adjacent rows 101 can be disposed staggered one another so as to reduce the pace between the two rows.

In the Figures illustrated for ease of reference, the shelf 52 receives three rows 101 of containers 100.

Once the loading of the freeze-dryer 50 is completed with the appropriate rows 101 of containers 100, the push bar 2 is taken by the first linear actuators 4 back to the retracted position D, the second linear actuators 5 being operated in a coordinated way with the first linear actuators 4, for example for maintaining the push bar always in the lowered position L (see FIG. 8).

Therefore the freeze drying chamber 51 can be closed to proceed with the freeze drying of the products in the containers 100.

Once the freeze drying process is over, the access opening 58 of the freeze drying chamber 51 is opened in order to allow the unloading or extraction of the containers 100 with a procedure for unloading the freeze-dryer 50 comprising a plurality of consecutive phases hereinafter described with reference to Figures from 9 to 18.

Figure 9:
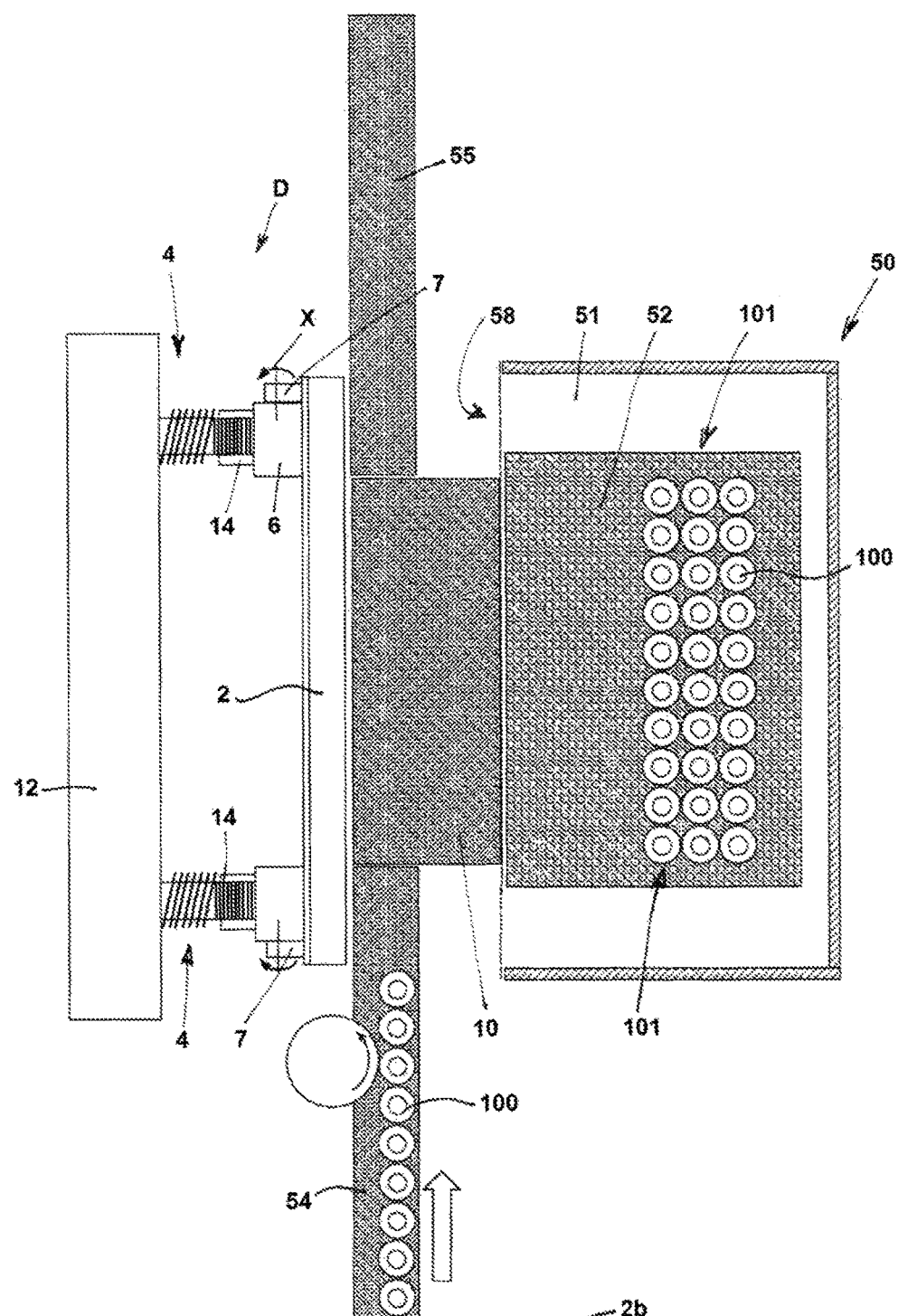
Figure 10:
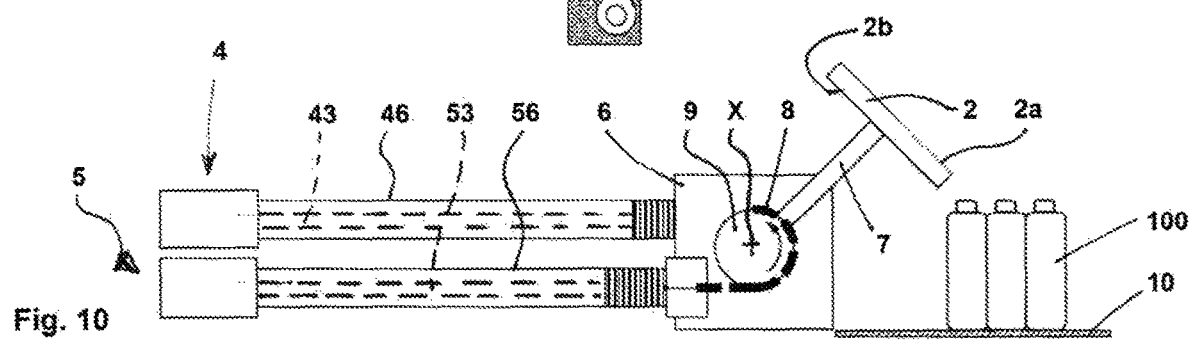
Figure 11:
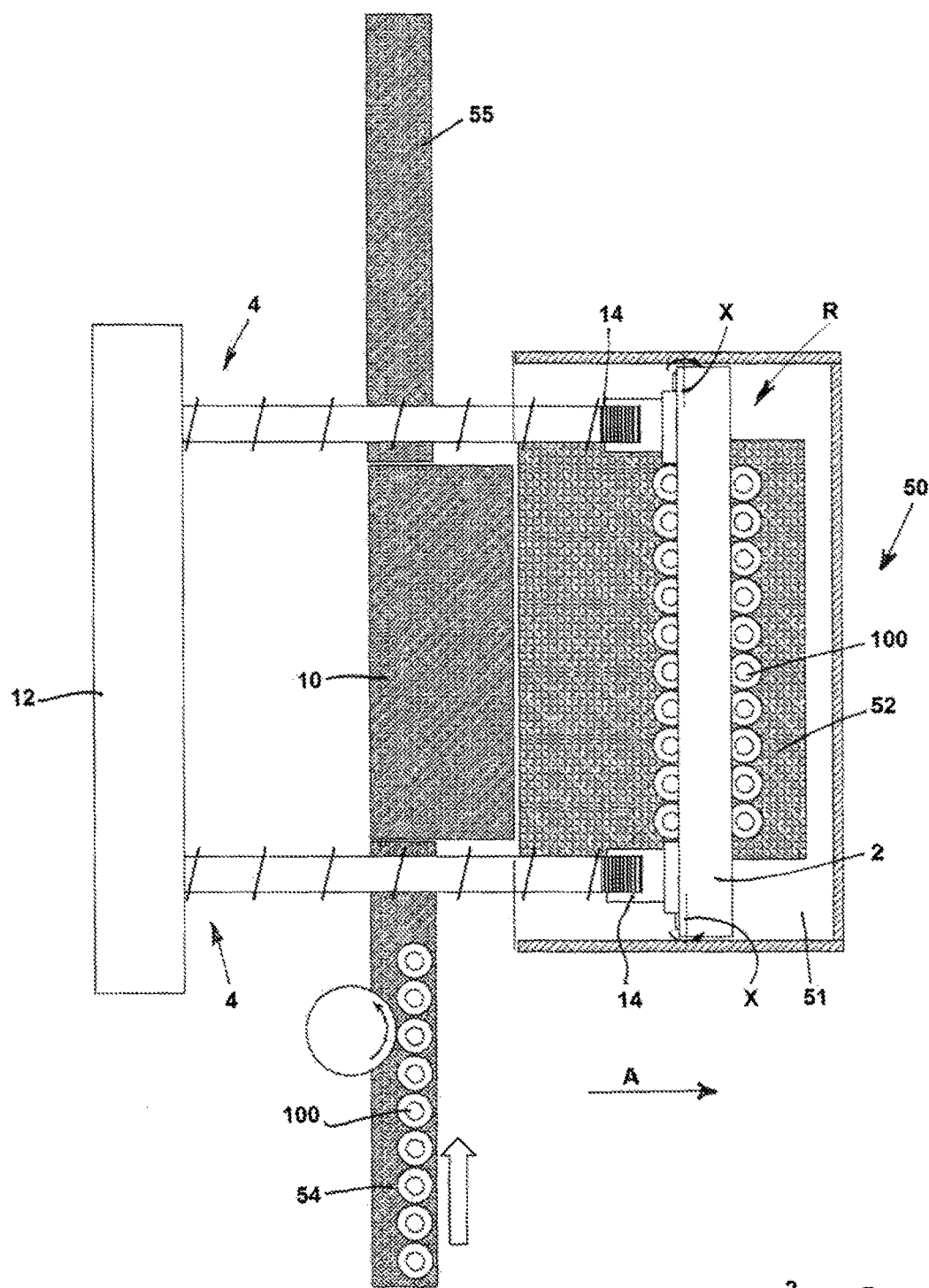
Figure 12:
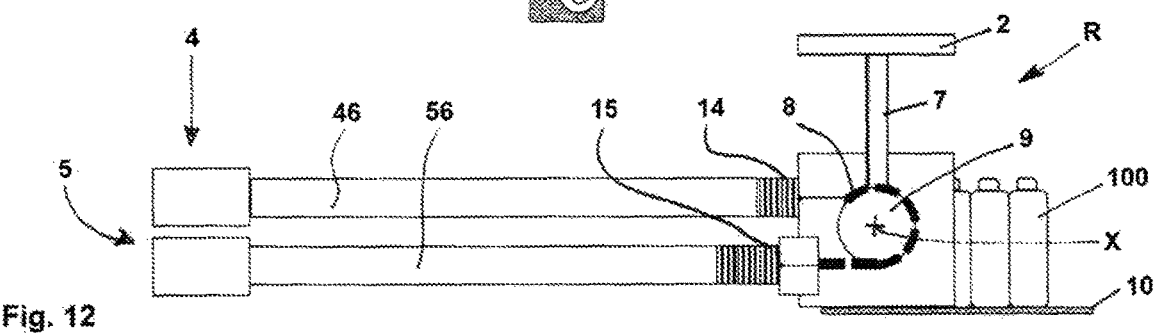

In a starting phase wherein the push bar 2 is in the retracted position D, the pair of second linear actuators 5 is initiated in a coordinated way so as to rotate the push bar 2 about the rotation axis X from the lowered position L to the raised position R (FIGS. 9 and 10). In such a way, during a following phase the push bar 2 can be moved by the first linear actuators 4 through the freeze drying chamber 51, without interacting with the containers 100, to an inner extended position E in the freeze drying chamber 51. During the movement of the push bar 2 along the direction of movement A, the second linear actuators 5 are initiates in a coordinated way with the first linear actuators 4 so as to maintain the aforesaid push bar 2 in the raised position R.

Figure 13:
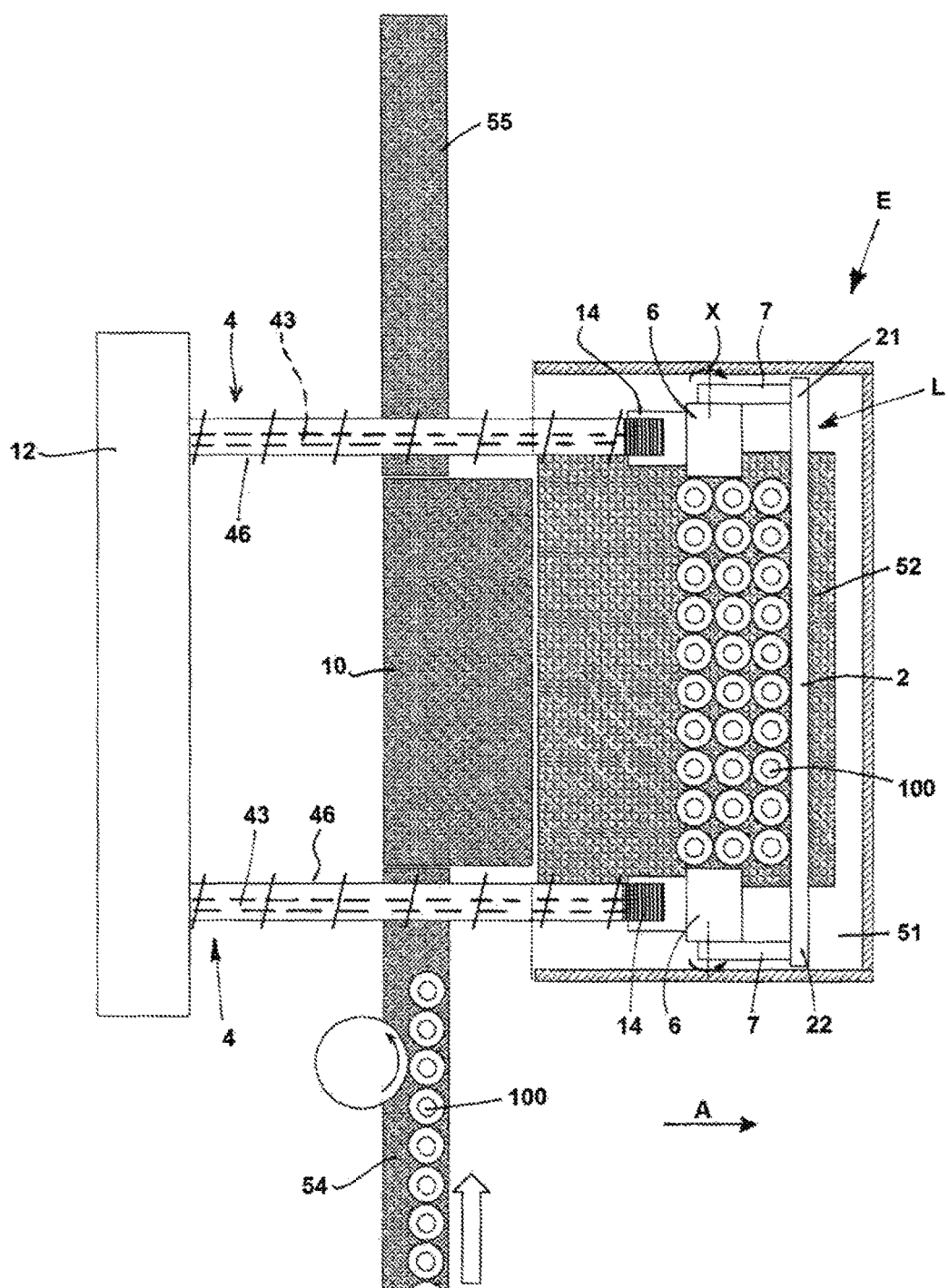
Figure 14:
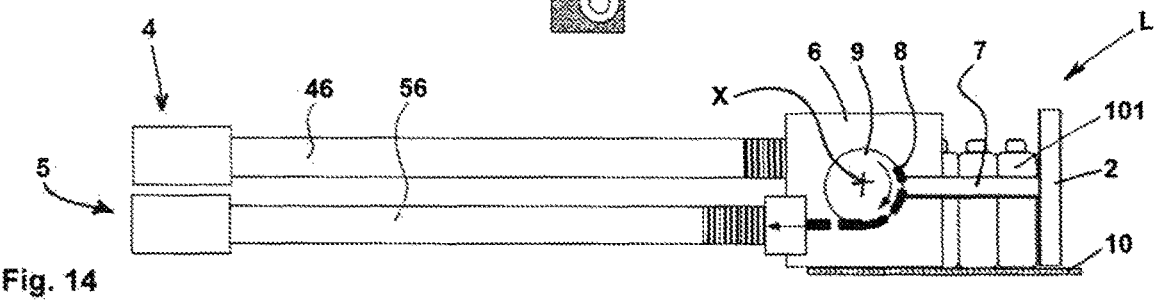

When the push bar 2 reaches the extended position E, the second linear actuators 5 are initiated to rotate, through the wheel 9 and the flexible element 8, the push bar 2 about the rotation axis X in the lowered position L in which a second flat and elongated wall 2b, opposite to the first wall 2a, finds the containers 100 of the first row 101 previously inserted on the shelf 52 (FIGS. 13 and 14).

Figure 15:
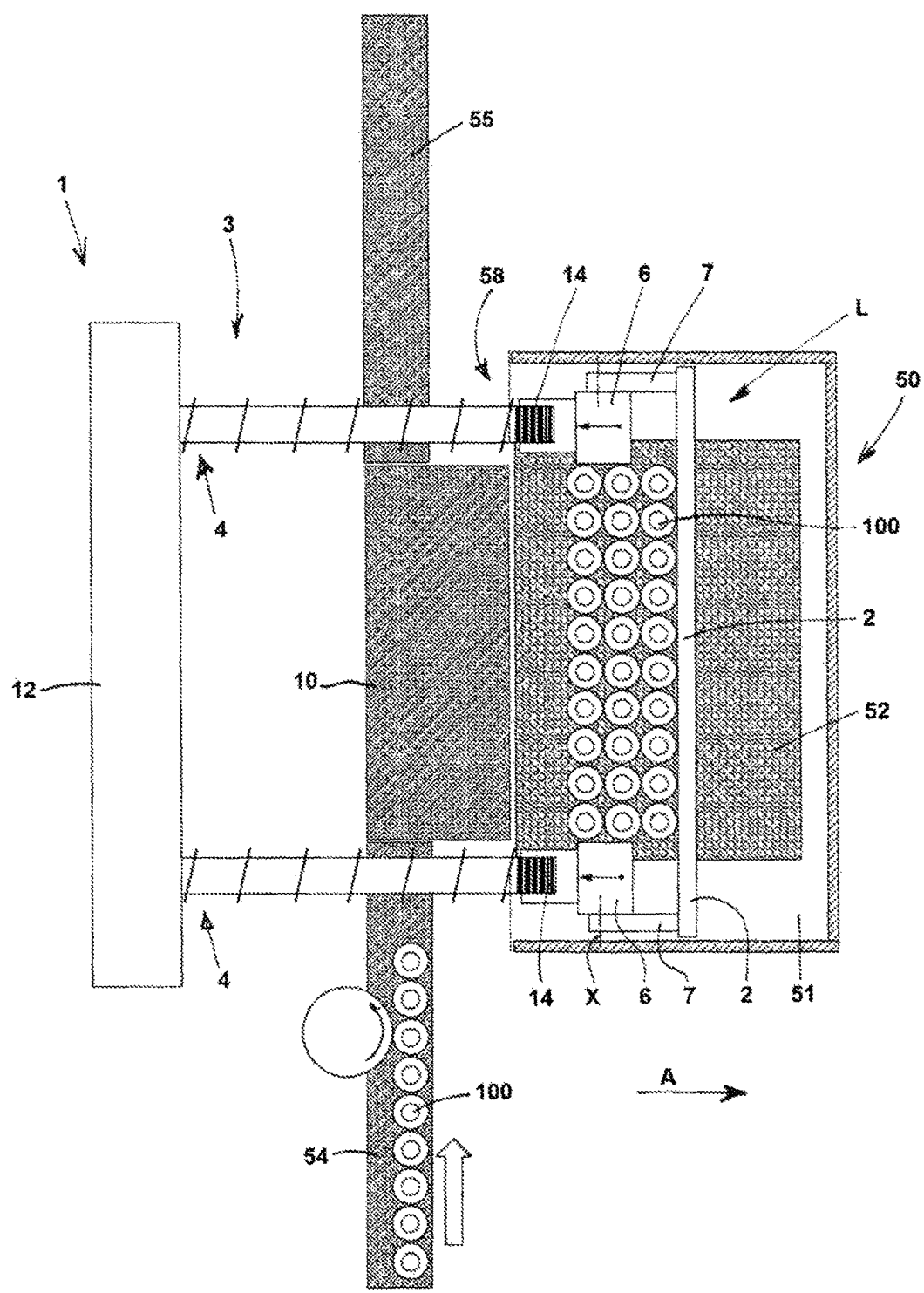
Figure 16:
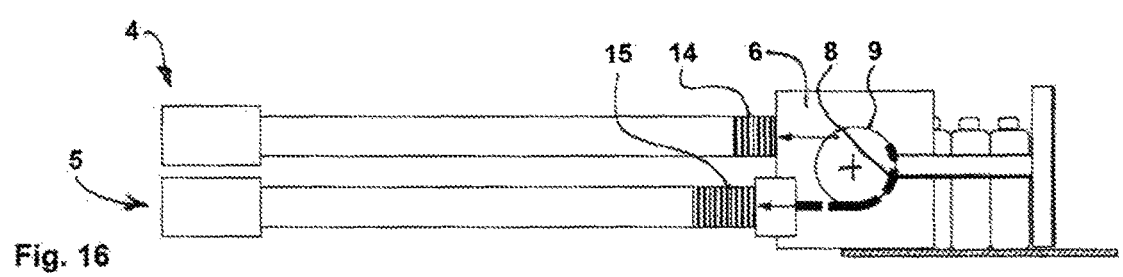

In a following phase, the push bar 2 is moved by the first linear actuators 4 along the direction of movement A so as to unload or extract the containers 100 of the freeze drying chamber 51 (FIGS. 15 and 16).

In particular, as shown in the Figures from 12 to 17, the push bar 2 is moved by the first linear actuators 4 along the direction of movement A according to an extra stroke phase starting from the extended position E, necessary to take the group of rows 101 to the movement means 54, 55, in particular to take a first row 101 of containers 100 to be unloaded to the second conveyor 55.

As shown in FIGS. 17 and 18, once the extra stroke phase is completed, the movement of the push bar towards the retracted position D occurs by paces p so as to allow the rows 101 of containers 100 to be exited, one at a time, from the freeze-dryer 50 through the second conveyor 55. During the movement of the push bar 2 the second linear actuators 5 are initiated in a coordinated way with the first linear actuators 4 so as to maintain the push bar in the required lowered position L.

Thanks to the movement apparatus 1 of the invention it is therefore possible to load or unload into/from a freeze drying chamber 51 of an industrial freeze-dryer 50 containers 100 containing a product to be freeze-dried/ freeze-dried in a quick and precise way.

The movement arrangement 3 comprising rigid interlocking chain linear actuators 4, 5, apart from guaranteeing a precise and reliable movement of the push bar 2 that moves the containers 100, has particularly compact sizes so as to reduce the total encumbrance of the freeze-dryer thereof. Since in each linear actuator 4, 5 the two flexible chains that in the functioning form the respective movement rigid interlocking chain 43, 53 can be separately winded on themselves inside the corresponding housings 42, the encumbers of the linear actuator are very limited even considering the considerable lengths of the movement rigid interlocking chain 43, 53, this allowing the displacement of the push bar within the freeze drying chamber 51 for the whole length or depth of the latter.

The use of second linear actuators 5 to rotate the push bar 2 about the rotation axis X between the lowered position L and the raised position R, allows to use in an efficient and simple way the push bar 2 thereof both for pushing and loading the containers 100 inside the freeze drying chamber 51 and for extracting and unloading the containers 100 out of the freeze drying chamber 51 once the freeze drying process is completed.

Since each second linear actuator 5 is substantially of the same type as the first linear actuator 4 and can be placed below the latter, the sizes of the movement apparatus 1 remain reduced and contained.

The use of containment flexible elements 46, 56, e.g. folding elements, sealingly enclosing the movement rigid interlocking chains 43, 53 of the linear actuators 4, 5 allows to protect the sterility of the environment wherein the freeze-dryer 50 is arranged and in particular to avoid the contamination of the containers 100 and of the product contained inside them caused by the mechanisms of the aforesaid linear actuators 4, 5.

In an alternative not illustrated embodiment, the movement apparatus according to the invention can be applied to a freeze-dryer comprising a freeze drying chamber 51 with two access openings, obtained on opposite walls of the chamber thereof. In detail, a first movement apparatus according to the invention can be arranged at a first access opening and a second movement apparatus according to the invention can be arranged at a second access opening, arranged in front of the first access opening.

The first movement apparatus can advantageously provide for loading the containers inside the freeze drying chamber 51, while the second movement apparatus can advantageously provide for unloading the containers inside the freeze drying chamber 51.

In other words, the alternative embodiment provides for the use a front push bar for loading the containers and a back push bar for unloading the tatter ones, the front push bar and the back push bar being moved by the corresponding rigid interlocking chain linear actuators of the above described type.

In such an alternative embodiment, it is not necessary for the push bars of the respective movement apparatuses to be rotatable and, consequently, the above described second rigid interlocking chain linear actuators can be omitted.

The invention claimed is:

1. A movement apparatus for loading/unloading containers into/from a freeze dryer provided with a freeze drying chamber that has at least one shelf for receiving and supporting the containers, the movement apparatus comprising:
   a push bar to engage and push the containers; and
   a movement arrangement for moving said push bar through said freeze drying chamber along a direction of movement,
   wherein said movement arrangement comprises at least a first rigid interlocking chain linear actuator that has a first movement rigid interlocking chain mobile along the direction of movement and provided with a first operating end connected to said push bar,
   wherein said movement arrangement further comprises at least a second rigid interlocking chain linear actuator that is arranged to rotate said push bar about a rotation axis at least between a lowered position wherein said push bar is arranged to engage and push the containers, and a raised position wherein said push bar does not interact with the containers, and
   wherein the rotation axis is transverse to the direction of movement.

2. The movement apparatus according to claim 1, wherein said movement arrangement comprises a pair of first rigid interlocking chain linear actuators that are connected to opposite ends of said push bar.

3. The movement apparatus according to claim 1, further comprising at least one movement element that is attached to said first operating end of said first rigid interlocking chain linear actuator and rotatably supporting about the rotation axis a support arm fixed to an end of said push bar.

4. The movement apparatus according to claim 3, wherein said second rigid interlocking chain linear actuator comprises a second movement rigid interlocking chain that is provided with a second operating end connected through transmission assembly to the support arm, and wherein said second movement rigid interlocking chain is mobile along the direction of movement so as to rotate said push bar about the rotation axis through said transmission assembly.

5. The movement apparatus according to claim 1, wherein said second rigid interlocking chain linear actuator is adjacent to said first rigid interlocking chain linear actuator.

6. The movement apparatus according to claim 1, wherein said second rigid interlocking chain linear actuator is arranged under said first rigid interlocking chain linear actuator.

7. The movement apparatus according to claim 1, wherein said first rigid interlocking chain linear actuator comprises a respective pair of roller chains that are flexible, mutually joint at said first operating end and can be separately wound within respective housings at least in a retracted position of said first rigid interlocking chain linear actuator, and wherein said roller chains are mutually coupled when moved towards each other so as to form said first movement rigid interlocking chain of variable length and mobile along the direction of movement.

8. The movement apparatus according to claim 1, further comprising a containment enclosure for housing said first and second rigid interlocking chain linear actuators, and wherein said first movement rigid interlocking chain and a second movement rigid interlocking chain of said second rigid interlocking chain linear actuator protrude through said containment enclosure.

9. The movement apparatus according to claim 8, further comprising at least one flexible containment element for sealingly enclosing and containing a respective movement rigid interlocking chain.

10. A freeze dryer comprising a freeze drying chamber that is equipped with at least one shelf to receive and support containers and with a movement apparatus according to claim 1 for loading/unloading the containers in/from said freeze drying chamber.

* * * * *